United States Patent

[11] 3,582,196

| [72] | Inventor | Jesse L. Colodner<br>Pearl River, N.Y. |
|---|---|---|
| [21] | Appl. No. | 781,824 |
| [22] | Filed | Dec. 6, 1968 |
| [45] | Patented | June 1, 1971 |
| [73] | Assignee | The Synchronex Corporation<br>New York, N.Y. |

[54] SCENE COMMENCEMENT INDICATING DEVICE FOR COMBINATION MOTION PICTURE CAMERA AND TAPE RECORDER
4 Claims, 1 Drawing Fig.
[52] U.S. Cl. .................................................... 352/24
[51] Int. Cl. .................................................... G03b 31/04
[50] Field of Search .......................................... 352/24, 23, 170, 236, 20

[56] References Cited
UNITED STATES PATENTS
| 2,673,485 | 3/1954 | Roderick .................... | 352/24 |
| 2,725,785 | 12/1955 | Templin ...................... | 352/24 |

Primary Examiner—Donald O. Woodiel
Attorney—Charles E. Temko

ABSTRACT: In a combination motion picture camera and simultaneously driven tape recorder, means for indicating on corresponding segments of film and tape the commencement of an individual scene. Illumination means is provided within the camera for exposing predetermined lengths of film in alternate frame fashion to result in an easily recognized pattern, and for simultaneously placing a distinctive signal on the corresponding tape segment during operation of the illuminating means.

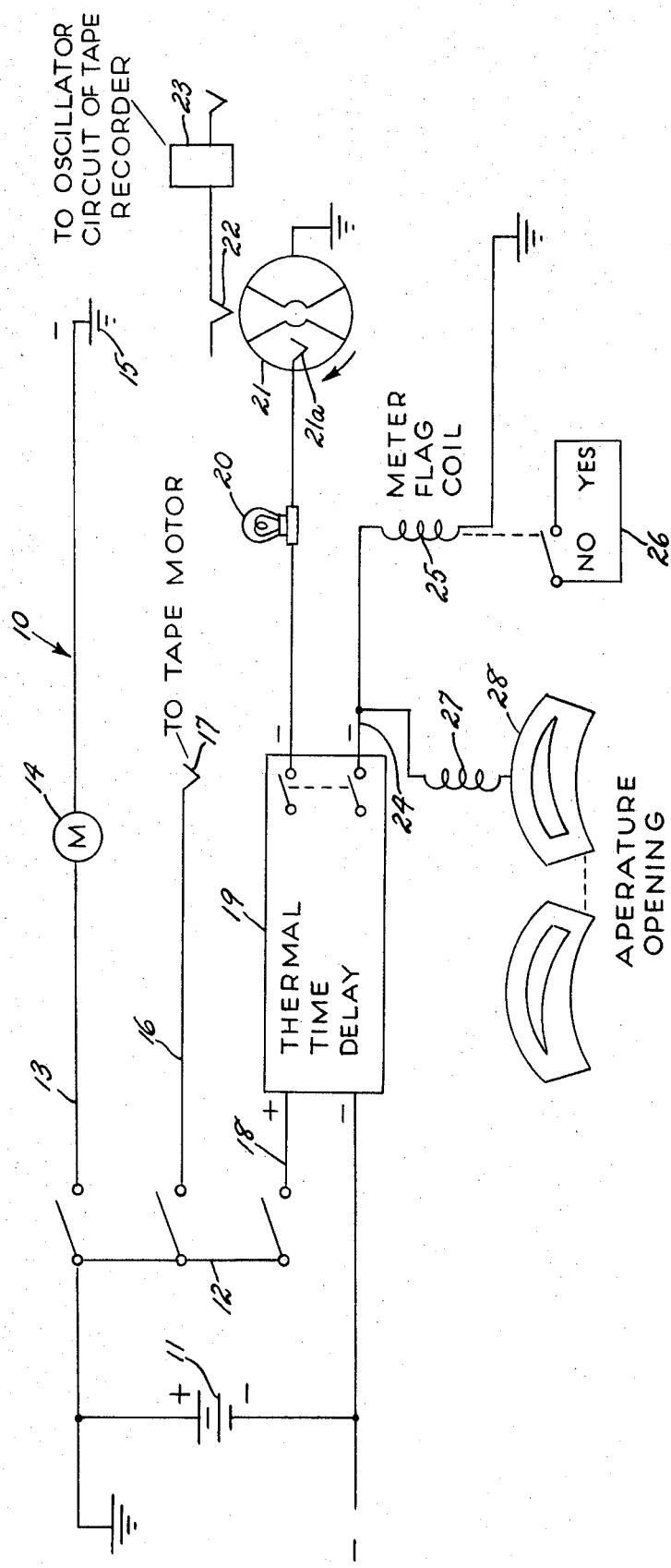

SCENE COMMENCEMENT INDICATING DEVICE FOR COMBINATION MOTION PICTURE CAMERA AND TAPE RECORDER

This invention relates generally to the field of amateur cinematography of the type in which a motion picture camera is operated in conjunction with a separate tape recorder. Devices of this type are known in the art, and are characterized by provision in the camera for simultaneously photographing the visual portion of an individual scene, and providing a synchronizing pulse transmitted to the tape recorder corresponding to a sprocket hole of an individual film frame. In an early stage of development of the art, the pulse is recorded on one track of a multitrack recorder, and a second track carried the audio portion of the scene. After processing of the film, the film could be shown using the recorded pulses on the tape to achieve synchronization therewith during projection.

Because of difficulties in achieving synchronization using the above method, it has proven more convenient to magnetically sound stripe the processed film, and to transfer the audio portion of the scene by re-recording the same upon the magnetic stripe. Once this has been accomplished, synchronization is permanently established, and the film may be subsequently edited by the user without loss of such synchronization. In such cases, the film may be projected using a conventional-type sound motion picture projector.

To assist the laboratory technician in carrying out the above process, it is necessary that both film and tape be marked to show commencement of individual scenes. In professional photography, this is usually accomplished by an assistant operating a "clapper" which is photographed simultaneously with the recording of the sound created by the clapper, the sound recorder being placed directly on the film during the photographing of the scene. In the case of amateur film, the assistant to operate the clapper is very often unavailable or unskilled, and the number of scenes on a relatively short roll of film are quite large. Since the photographer is often also unskilled, synchronization of film and tape over the entire length thereof is usually lost with the completion of the first scene, and the laboratory technician must resynchronize the sound and film with the commencement of each scene.

The resynchronization is difficult and time consuming. The operator must manually advance the film to a starting position by visually watching for the closing of a previous scene, or the commencement of a new one. He then must advance the tape to a start position by listening for the commencement of sound, either from a clap marker or the sound itself. The re-recording may then proceed with synchronization available for the particular scene being recorded. The operator must stop operation at the end of each scene, and the above steps are repeated.

It will be apparent, that in the absence of the photographing of a clapper, and a corresponding sound on the tape, difficulty will be encountered in separating the scenes. Further, once the commencement of a scene has been located, very often it has been started on the next adjacent frame following the completion of a previous scene. In order to achieve separation of film between scenes, it would be necessary to render the tape recorder inoperative, to cover the lens, and run the camera for a period of time, a procedure normally forgotten by the average amateur. The same is true for the separation on the tape, although this can be accomplished simultaneously, by rendering the recording head inoperative.

Accordingly, it is among the principal objects of the present invention to provide means whereby the disadvantages of the above described procedure have been substantially eliminated.

Another object of the invention lies in the provision of improved means for accomplishing the above end, which may be incorporated directly into the camera and tape recorder, to be self operative upon the commencement of photographing each successive scene.

A feature of the disclosed embodiment lies in the fact that the inventive structure may be conveniently incorporated into existing camera designs with little or no modification.

These objects and features, as well as other incidental ends and advantages, will more fully appear in the progress of the following disclosure, and be pointed out in the appended claims.

Briefly stated, the invention contemplates the provision of an on-off switch in the camera which applies power to the camera drive motor. It simultaneously applies power to the tape recorder motor through the use of an interconnecting cable between the camera and the recorder. While the camera and recorder motors are in operation, a rotating switch in the camera similar to that disclosed in my prior U.S. Pat. No. 3,297,835, granted June 10, 1967, turns on and off an oscillator circuit associated with the recorder in proportion to the speed of the camera. The same rotating switch turns on and off an incandescent bulb operating from the camera drive battery power source in proportion to the speed of the camera. After a period of seconds, through the use of a timing circuit of thermal, transistor or silicon controlled rectifier type, the bulb ceases flashing, and the oscillator circuit becomes inoperative. The bulb (while flashing) illuminates an entire frame of film to provide a pattern of periods of light and dark frames which are used as the optical part of the scene commencement indicating means. The tape recorder having recorded pulsed oscillations which are easily distinguishable from other recorded sounds provides a corresponding scene commencement indicia. Since the mechanical equivalent of a "clap marker" is provided within the camera, and it is automatically operated upon the commencement of photographing each scene, no assistant is required to operate the clap marker, and its operation can not be forgotten or misused.

In the drawing, the single figure is a schematic representation of an embodiment of the invention.

In accordance with the invention, the device, generally indicated by reference character 10 is incorporated in a motion picture camera of the class described (not shown) the camera including a self-contained battery power source 11 connected in series with a main power switch 12 of ganged type. Closing of the switch, which will occur at the time of commencement of photographing of an individual scene, will complete a first circuit 13 carrying current to the camera drive motor 14 and thence to ground at 15. A second simultaneously closed circuit 16 leads to a jack 17 providing interconnection to the drive motor of the tape recorder for simultaneous operation.

A third circuit 18 is also closed by the switch 12, and conducts current to a thermal time delay circuit 19 of a type which will be conductive for approximately 1 to 2 seconds after the closing of the switch 12, and which will thereafter open. A first circuit in series with the time delay circuit 18 includes a 6 volt incandescent bulb, this circuit being in series with a rotating switch 21 causing a conductive pulse with the advancement of each alternate film frame or group of frames (not shown). The switch 21 is not to be confused with the usual pulse generating switch (not shown) which is also driven by the camera drive motor 14 to provide a pulse for each frame or group of frames which pulse is employed for individual frame synchronization. The circuit to the bulb 20 is completed through a first brush 21A.

A second brush 22 also completes a circuit through the switch 21 and operates a relay 23 leading to the oscillator circuit of the taper recorder, so that distinctive pulses will correspond to the fogged areas on the film caused by the bulb 20.

During the creation of visual and audible scene commencement indicia, it is desirable that the camera be temporarily disabled from photographing the scene, which would otherwise appear on the dark frames which are alternately positioned between the fogged frames. To achieve this end, a solenoid circuit 24 is also connected in series with the thermal time delay circuit 19, and transmits current to a first solenoid 25, the armature of which moves an indicating flag 26 positioned within the view finder (not shown) of the camera, thus apprising the operator that he is not to consider any other image visible in the view finder as part of the photographed scene. A second solenoid 27 is connected in parallel with the coil 25, the armature of which serves to close the diaphragm 28 controlling the passage of light through the lens to the smallest opening, so that whatever light is present on the scene will not cause the formation of a recordable image. In the case where the camera is of a type having an electrically operated diaphragm or aperture device responsive to a photoelectric light meter, as for example, those disclosed in U.S. Pat. No. 2,841,064 to Bagby et al. dated July 1, 1958, and U.S. Pat. NO. 3,044,383 to Akahane dated July 7, 1962 the coil 27 may be eliminated, with a corresponding loss of function, and the current routed directly to the already present solenoid. In such case, it must be of an intensity sufficient to substantially completely close the diaphragm or aperture means below the normally smallest aperture.

I claim:

1. In a combination motion picture camera and tape recorder used for synchronously recording the audio and visual portions of a scene, improved means for simultaneously indicating upon corresponding segments of film and tape the commencement of a given scene to facilitate subsequent synchronization of the same, comprising: switch means on said camera for simultaneously commencing operation of said camera and tape recorder, a timing circuit placed in operation by closing said switch means, electrically powered illumination means positioned within said camera to expose individual areas of film during the period in which said timing circuit is conducted, oscillator means activated by said timing circuit connected to said tape recorder for recording a distinctive signal on a corresponding segment of tape; said illumination means having circuit breaking means in series therewith for providing light pulses synchronized with film advancement to fog alternate areas of film, said tape recorder recording distinctive signals during the period of operation of said illumination means.

2. Structure in accordance with claim 1, including means placed in operation by said timing circuit for closing the aperture to the lens of said motion picture camera during operation of said illuminating means.

3. Structure in accordance with claim 2, said last-mentioned means including a solenoid.

4. Structure in accordance with claim 2, including means controlled by said timing circuit providing in the view finder of said camera an indication that said time delay circuit is in operation.